(12) United States Patent
Ogawa

(10) Patent No.: US 10,257,407 B2
(45) Date of Patent: Apr. 9, 2019

(54) FOCUS DETECTION APPARATUS, CONTROL METHOD THEREFOR, AND STORAGE MEDIUM FOR USE THEREWITH

(71) Applicant: CANON KABUSHIKI KAISHA, Tokyo (JP)

(72) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/826,469

(22) Filed: Nov. 29, 2017

(65) Prior Publication Data
US 2018/0160028 A1   Jun. 7, 2018

(30) Foreign Application Priority Data
Dec. 6, 2016 (JP) .................................. 2016-237111

(51) Int. Cl.
*H04N 5/232* (2006.01)
*G03B 13/00* (2006.01)

(52) U.S. Cl.
CPC ... *H04N 5/23212* (2013.01); *H04N 5/232122* (2018.08)

(58) Field of Classification Search
CPC ........ H04N 5/23212; G02B 7/28; G02B 7/36; G02B 7/365; G02B 7/285; G02B 7/38; G03B 3/00; G03B 13/36; G03B 13/28; G03B 13/30
See application file for complete search history.

(56) References Cited

U.S. PATENT DOCUMENTS

| | | | | |
|---|---|---|---|---|
| 8,953,091 B2 * | 2/2015 | Hamada | ................. | G03B 13/36 348/349 |
| 2008/0302947 A1 * | 12/2008 | Utagawa | .................. | G02B 7/32 250/201.8 |
| 2013/0113987 A1 * | 5/2013 | Fukuda | .................... | G02B 7/28 348/349 |
| 2014/0146221 A1 * | 5/2014 | Kimura | .................. | G03B 13/36 348/353 |
| 2014/0320610 A1 * | 10/2014 | Oigawa | ................ | H04N 13/239 348/47 |
| 2014/0332661 A1 * | 11/2014 | Fukuda | .............. | H04N 5/23212 250/201.7 |

FOREIGN PATENT DOCUMENTS

JP      2014-219549 A    11/2014

* cited by examiner

*Primary Examiner* — Kelly L Jerabek
(74) *Attorney, Agent, or Firm* — Canon U.S.A., Inc. I.P. Division

(57) ABSTRACT

Focus detection apparatuses, control methods, and storage mediums for use therewith are provided herein. In a focus detection apparatus, a difference amplification unit performs processing for amplifying a difference between an A-image signal and a B-image signal and a CPU determines whether or not a focus state is a false in-focus state on a basis of a result of a correlation calculation performed by a correlation calculation unit on the A-image signal and the B-image signal. The A-image signal and the B-image signal are output from an imaging sensor that receives a pair of luminous fluxes passing through different pupil areas of an imaging optical system.

8 Claims, 13 Drawing Sheets

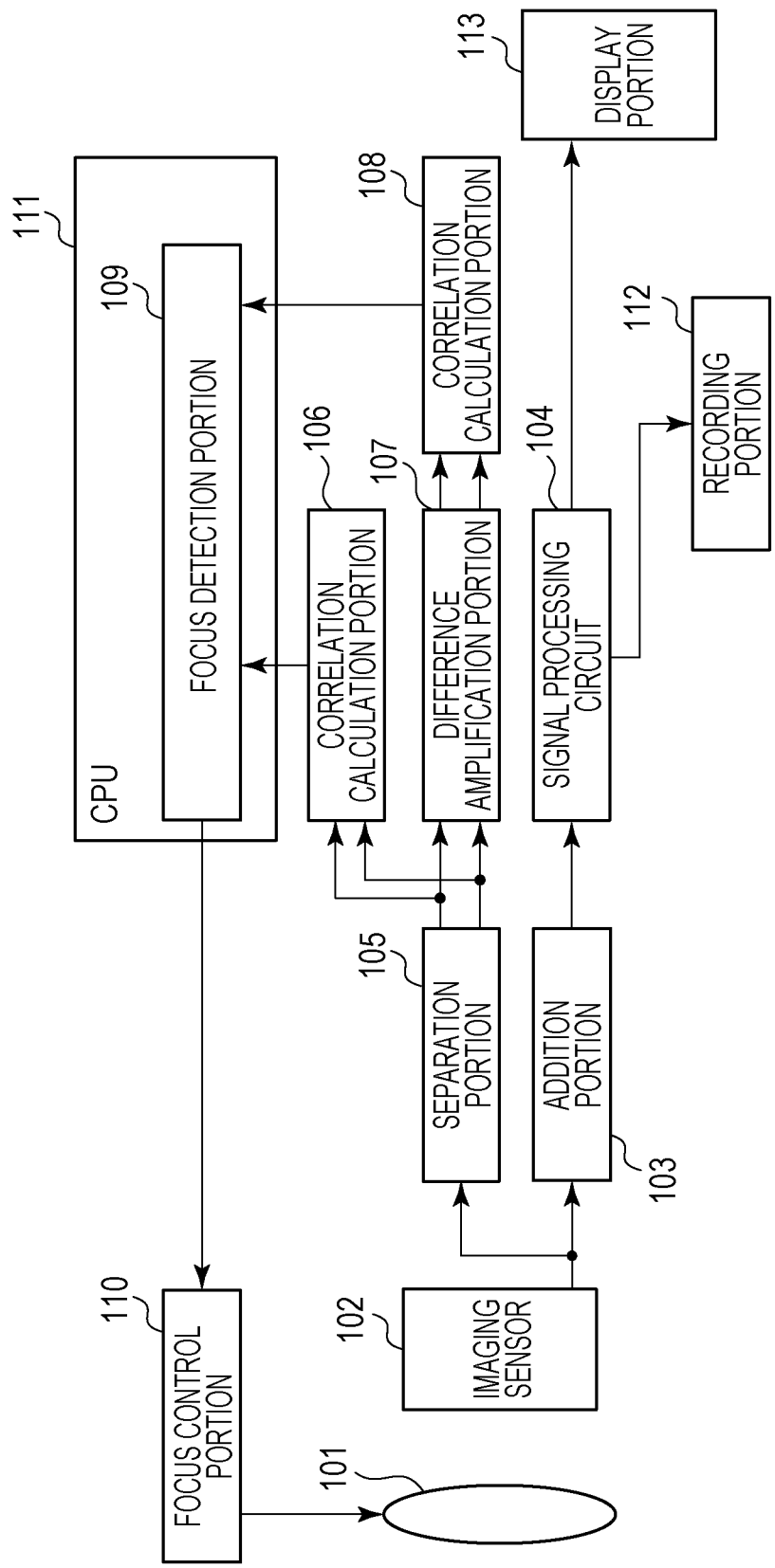

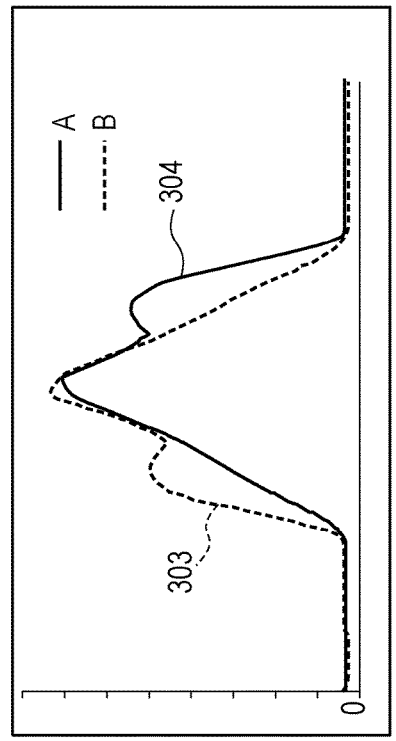
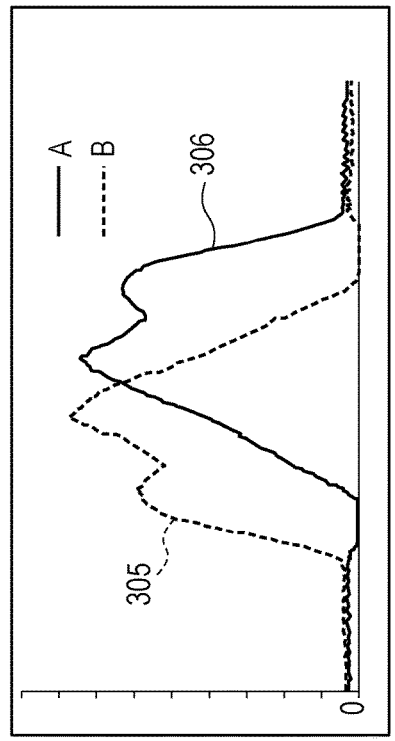
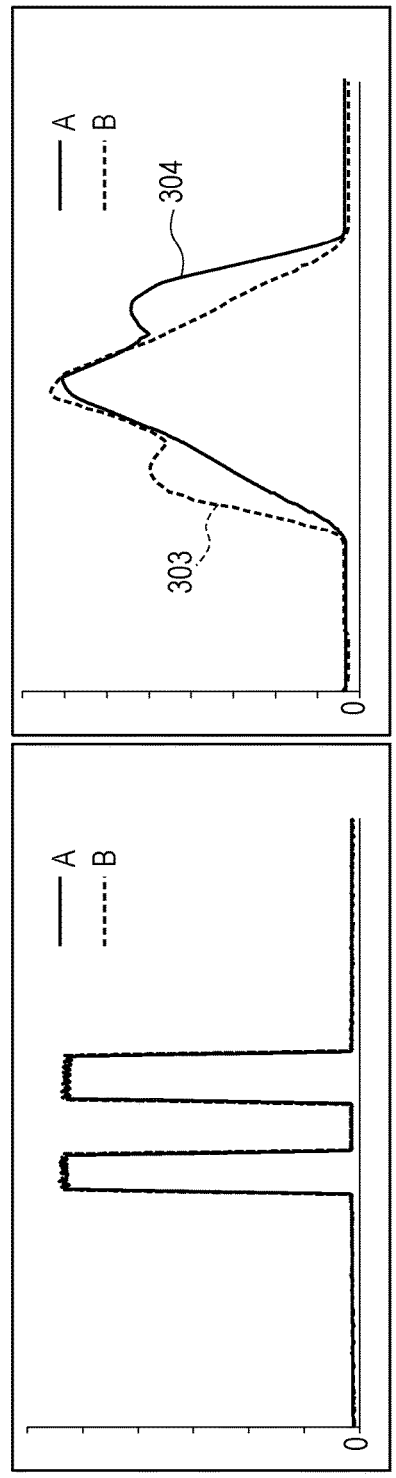
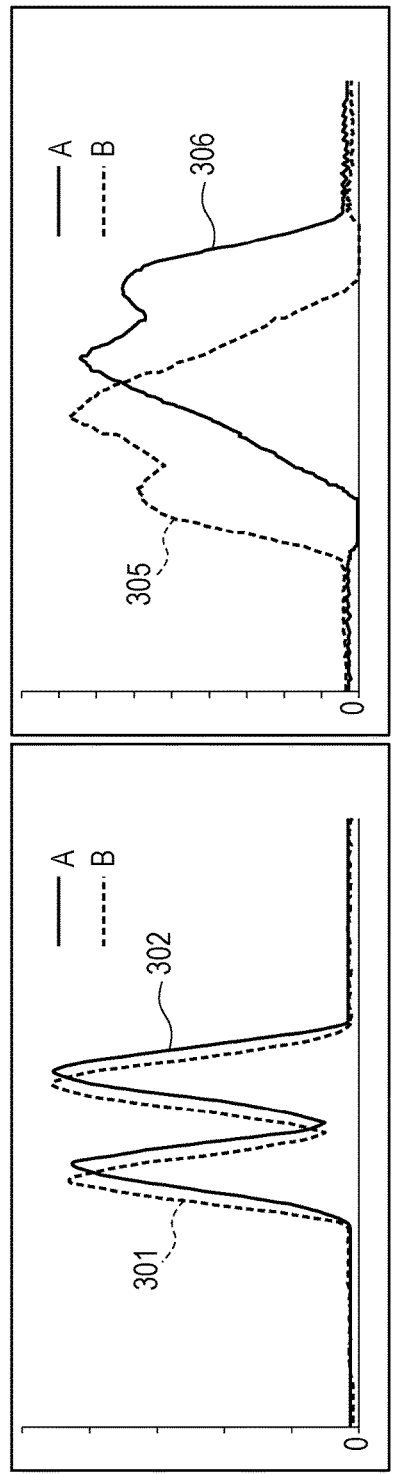
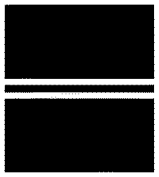

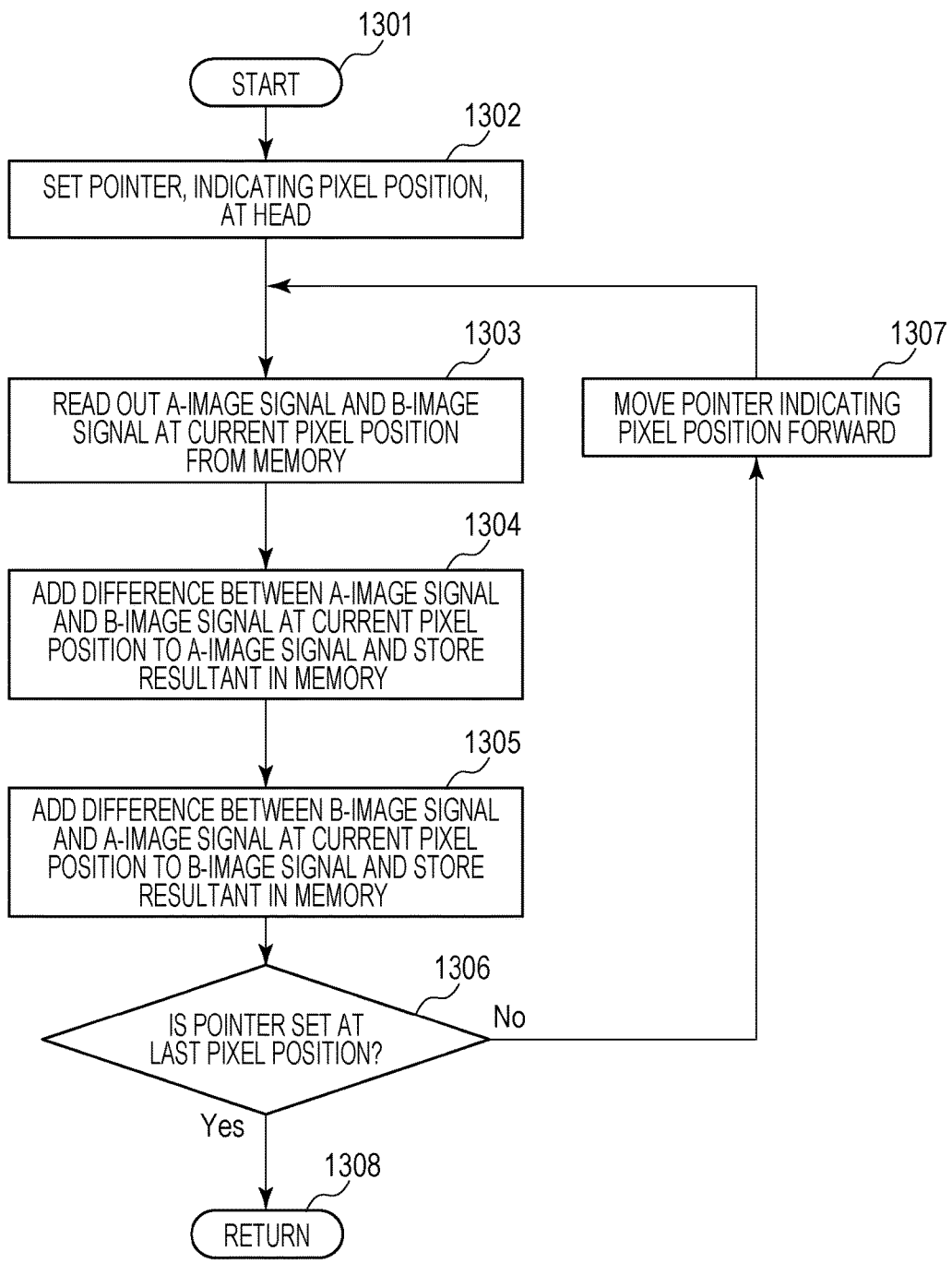

FOCUS DETECTION APPARATUS, CONTROL METHOD THEREFOR, AND STORAGE MEDIUM FOR USE THEREWITH

BACKGROUND OF THE INVENTION

Field of the Invention

The present disclosure generally relates to signal processing, and in particular it relates to signal processing of at least one embodiment of a focus detection apparatus, control method therefor and storage medium for use therewith.

Description of Related Art

Focus detection, and in particular autofocusing (AF) can be achieved by phase detection or contrast measurement. Phase detection is achieved by dividing incoming light into pairs of image signals and comparing them by correlation calculation. Conventionally, when correlation calculation for focus detection using a phase difference system is performed, it is known that there is a case where a pair of image signals become unsymmetrical to each other (also referred to as image signal distortion) when the correlation calculation is performed in a state where an image is blurred. When the correlation calculation using the pair of image signals in which the image signal distortion is generated is performed, it is also known that, depending on conditions of an object and a blur, there is a case where a false in-focus state in which a correlation calculation result indicating as if an in-focus state was achieved despite the blur is obtained is provided.

Japanese Patent Application Laid-Open No. 2014-219549 discloses a technique for focus detection using a phase difference system, as follows. First, filter processing for performing edge extraction for cutting a DC component of each of a pair of image signals is performed. Then correlation calculation is performed, and on the basis of a correlation calculation result using the pair of image signals subjected to the filter processing, whether or not a focus state is an in-focus state is determined. When the focus state is determined to be the in-focus state, filter processing for suppressing a high frequency noise component without cutting a DC component is further performed for each of the pair of image signals. Then, on the basis of a result of the correlation calculation using the pair of image signals subjected to the filter processing, whether or not a false in-focus state exists is determined.

In the conventional technique disclosed in Japanese Patent Application Laid-Open No. 2014-219549, even when the filter processing for suppressing the high frequency noise component is performed, for example, in a case where the DC components of the pair of image signals have approximately the same value, there is still a possibility that the focus state is determined to be an in-focus state despite being a false in-focus state.

SUMMARY OF THE INVENTION

Embodiments of the present disclosure disclose technical solutions for determining more accurately whether or not a false in-focus state exists.

According to at least one embodiment of the present disclosure, a focus detection apparatus includes a calculation unit configured to perform a first correlation calculation in accordance with a pair of image signals, which pair of image signals is based on an output of an imaging sensor that receives a pair of luminous fluxes passing through different pupil areas of an imaging optical system and performs photoelectric conversion to the pair of luminous fluxes, a difference amplification unit configured to amplify a difference between a first image signal and a second image signal of the pair of image signals, and output a third image signal corresponding to the first image signal and a fourth image signal corresponding to the second image signal, and a false in-focus determination unit configured to determine whether or not a focus state is a false in-focus state on a basis of a result of a second correlation calculation according to the third image signal and the fourth image signal.

According to other aspects of the present disclosure, one or more additional focus detection apparatuses, one or more control methods and one or more storage mediums for use with same are discussed herein. Further features of the present disclosure will become apparent from the following description of exemplary embodiments with reference to the attached drawings.

BRIEF DESCRIPTION OF THE DRAWINGS

FIG. 1 is a block diagram of a focus detection apparatus according to at least Embodiment 1.

FIGS. 3A, 3B, 3C, and 3D illustrate waveforms of an A-image signal and a B-image signal, and FIG. 3E illustrates an example of a subject.

FIG. 13 is a sub-flowchart of difference amplification processing according to at least Embodiment 3.

DESCRIPTION OF THE EMBODIMENTS

Hereinafter, embodiments of the present disclosure will be described with reference to attached drawings.

<Embodiment 1>

With reference to a block diagram of FIG. 1, a focus detection apparatus is described herein using an example of a camera. However, the present embodiment is not limited to a camera; other equivalent apparatuses such as an image projector or the like may also be applicable in one or more embodiments of the present disclosure.

According to Embodiment 1, the focus detection apparatus includes an imaging optical system, an image sensor 102, a focus control unit 110 and a CPU 111. The imaging optical system of the present embodiment includes at least a focus lens 101. An imaging sensor 102 receives a luminous flux passing through the imaging optical system. The imaging sensor 102 includes a plurality of pixel portions which are two-dimensionally arranged.

Each of the pixel portions of the imaging sensor 102 is configured to output a signal used for focus detection using an imaging plane phase difference system.

Figure 2A:
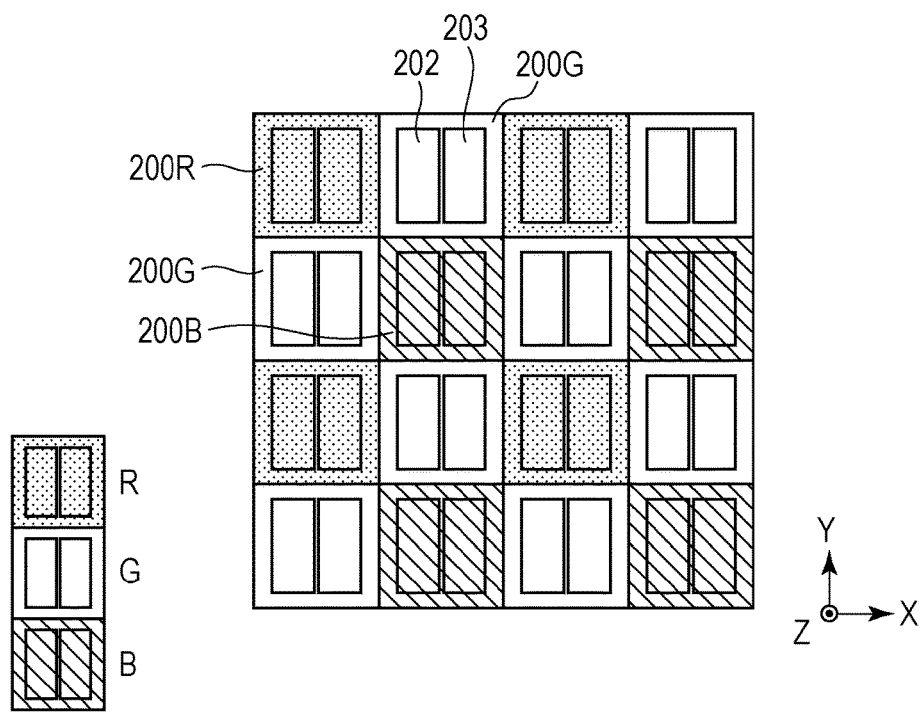
FIG. 2A is a plane view illustrating a pixel array.

In FIG. 2A, a pixel array of the imaging sensor 102 (in present embodiment, as an example, a two-dimensional CMOS sensor) is represented by a pixel array of 4 rows×4 columns of pixels. As to coordinate axes indicated by X, Y, and Z, an X-Y plane is located in a plane of FIG. 2A, and a Z-axis is an axis perpendicular to the X-Y plane.

Figure 2B:
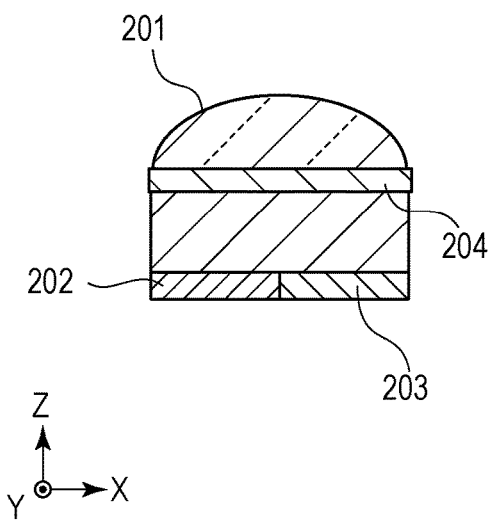
FIG. 2B is a sectional view of a pixel portion of at least one embodiment.

As illustrated in FIG. 2B, each of the pixel portions has a color filter 204, and these color filters 204 are arranged in a Bayer pattern, as illustrated in FIG. 2A. In the Bayer pattern, a group of 4 pixel units are arranged two-dimensionally. Two pixel portions 200G each having G (green) spectral sensitivity are arranged as two diagonal pixels. Additionally, a pixel portion 200R having R (red) spectral sensitivity and a pixel portion 200B having B (blue) spectral sensitivity are arranged diagonally as the other two pixels.

FIG. 2B is a sectional view of a pixel portion 200 included in the imaging sensor 102. The pixel portion 200 includes a micro lens 201, the color filter 204, an A-pixel 202, and a B-pixel 203. In the present embodiment, the A-pixel and the B-pixel are photodiodes each of which performs photoelectric conversion of a light flux incident thereupon to an electric signal. In this manner, each pixel portion 200 is configured in such a manner that the two photodiodes are provided in the pixel portion as a pair of the A-pixel and the B-pixel, so that the A-pixel and the B-pixel receive a pair of luminous fluxes having passed through different pupil areas of the imaging optical system and having a parallax. With a plurality of pixel portions configured as described above, the imaging sensor 102 is able to obtain an A-image signal and a B-image signal as a pair of image signals. An output of the A-pixel and an output of the B-pixel are added and thereby a Bayer signal which is not pupil-separated is obtained.

Each processing of the focus detection apparatus of the present embodiments is controlled by a CPU 111.

An output of the imaging sensor 102 is input to an addition portion 103 and a separation portion 105.

The signal which becomes the same signal as that of the imaging sensor 102 in the Bayer array as a result of addition of the output of the A-pixel and the output of the B-pixel by the addition portion 103 is input to a signal processing circuit 104, and a color image signal is generated.

The image signal generated by the signal processing circuit 104 is recorded in a recording portion 112 or displayed on a display portion 113.

The separation portion 105 separates outputs of A-pixels and outputs of B-pixels of the pixel portions, which are transmitted in a mixed state, into A-image signals and B-image signals, and outputs the resultant at synchronized timing. The output from the separation portion 105 is input to a difference amplification portion 107 and a correlation calculation portion 106.

The difference amplification portion 107 performs processing of amplifying a difference between an A-image signal (first image signal) and a B-image signal (second image signal). An A'-image signal (third image signal) and a B'-image signal (fourth image signal) which are obtained by amplifying the difference are input to a correlation calculation portion 108.

The correlation calculation portion 106 and the correlation calculation portion 108 are circuit portions for performing well-known correlation calculation. Details thereof will be described later.

Outputs from the correlation calculation portion 106 and the correlation calculation portion 108 are input to a focus detection portion 109 which is a part of the CPU 111. On the basis of at least one of results of the correlation calculation portion 106 and the correlation calculation portion 108, the focus detection portion 109 performs detection of a phase difference in which a degree of coincidence between two images is high. Additionally, on the basis of the phase difference, a defocus amount is detected.

The CPU 111 drives the focus lens 101 via a focus control portion 110 in accordance with the defocus amount calculated by the focus detection portion 109.

Figure 5:
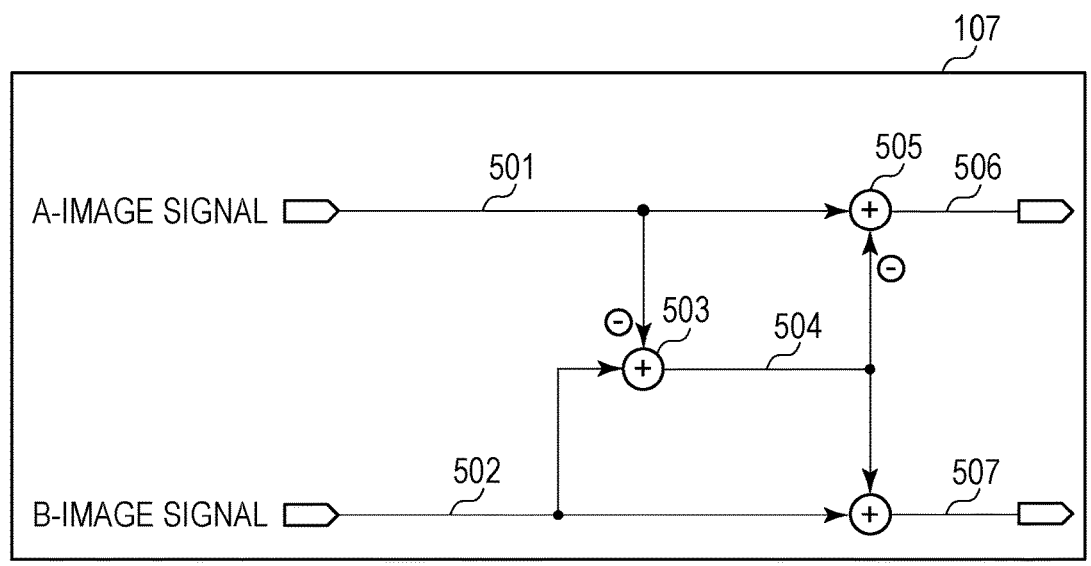
FIG. 5 is a circuit diagram of a difference amplification portion of at least Embodiment 1.

FIG. 5 is a circuit diagram of the difference amplification portion 107. An arithmetic portion 503 detects a difference 504 between an A-image signal 501 and a B-image signal 502. By subtracting the difference 504 from the A-image signal and adding the difference 504 to the B-image signal, an A'-image signal 506 (third image signal) and a B'-image signal 507 (fourth image signal) which are obtained by amplifying the difference 504 are output. Detailed processing of the difference amplification portion 107 will be described later.

Figure 6A:
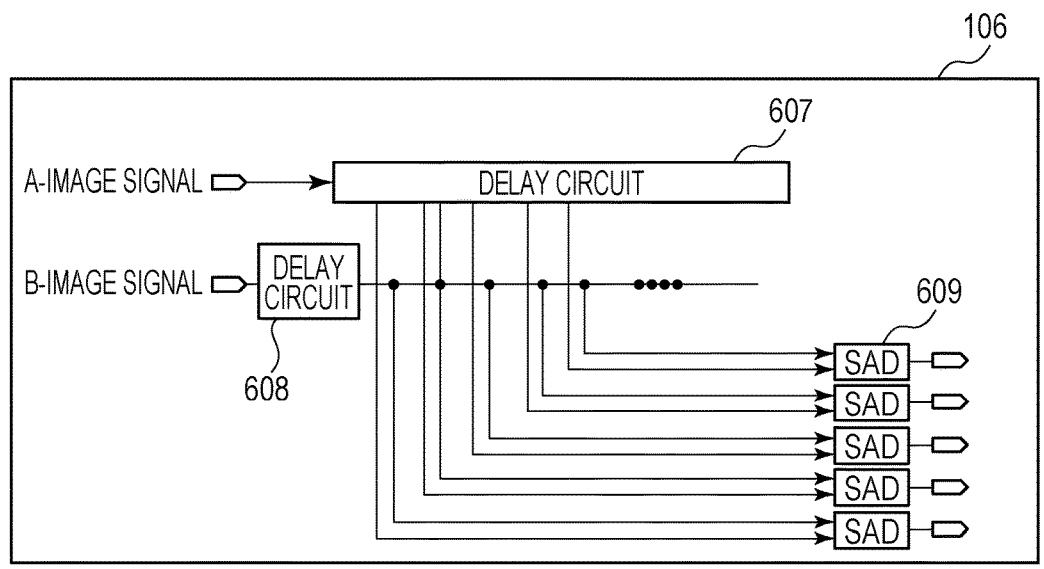
FIGS. 6A and 6B are circuit diagrams of correlation calculation portions.

FIG. 6A is a circuit diagram of the correlation calculation portion 106. In the correlation calculation portion 106, a delay circuit 607 and a delay circuit 608 respectively adjust timings of outputs of the A-image signal and the B-image signal. The A-image signal having different delay with respect to the B-image signal is input to each of a plurality of SAD (sum of absolute differences) circuits 609.

Figure 6B:
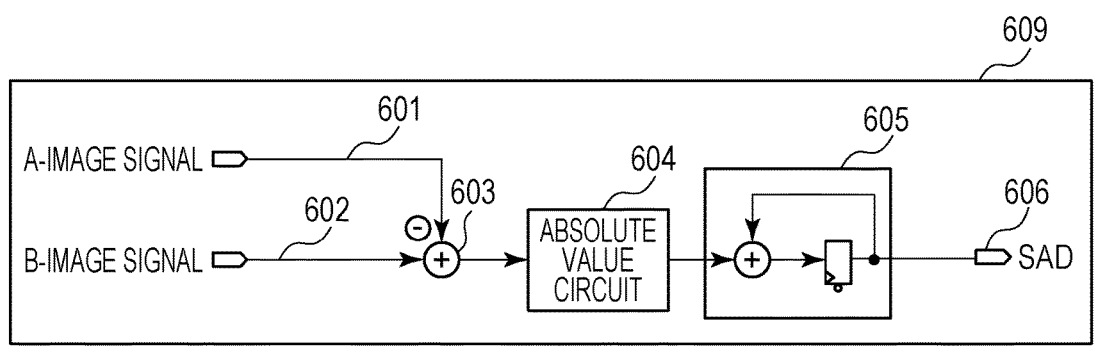

FIG. 6B is a circuit diagram of each of the SAD circuits 609. The SAD circuit 609 is a circuit for integrating an absolute value of a difference between an A-image signal and a B-image signal. For example, a difference between an A-image signal 601 and a B-image signal 602 is calculated by an arithmetic portion 603, the difference is converted into an absolute value by an absolute value circuit 604, and the absolute value is integrated by an integrating circuit 605. Thereby, a sum of absolute differences for a certain phase difference is output. Since the A-image signal having different delay with respect to the B-image signal is input to each of the SAD circuits 609 as described above, a sum of absolute differences according to various phase differences is output from each of the SAD circuits 609. The sum of absolute differences, which is output from each of the SAD circuits 609, is output to a focus detection portion 109.

Since a circuit diagram of the correlation calculation portion 108 is similar to the circuit diagram of the correlation calculation portion 106, the description will focus on the correlation calculation portion 106 and the description of the correlation calculation portion 108 will be omitted. However, the correlation calculation portion 108 is different from the correlation calculation portion 106 in that correlation calculation is performed by using the A'-image signal and the B'-image signal instead of the A-image signal and the B-image signal.

[Relation between Degree of Blur and False In-focus State]

Here, waveform shapes of the A-image signal and the B-image signal according to a degree of a blur will be described with reference to FIGS. 3A to 3C.

FIG. 3A illustrates signal waveforms of the A-image signal and the B-image signal when a subject (for example, a subject as illustrated in FIG. 3E) in which two white parts are present on a black background is in-focus. In a case of an in-focus state, even when pupil separation is performed, centers of gravity of the A-image signal and the B-image signal coincide, and both the A-image signal and the B-image signal are sharp images.

FIG. 3B illustrates a state in which the same subject is slightly defocused (blurred) compared to that of FIG. 3A.

There is a shift of the center of gravity of an image between the A-image signal 301 and the B-image signal 302. It is possible to calculate a defocus direction and a defocus amount by detecting the shift of the image.

FIG. 3C illustrates the A-image signal and the B-image signal which are in a further defocused state from the state of FIG. 3B. In a state with large defocus, the A-image signal and the B-image signal have inverse deviations in a blurred state and a shading state on the right and left, so that collapse (also referred to as image signal distortion) is caused in the image signals as illustrated in FIG. 3C. In particular, the image signal distortion is notably caused in an imaging sensor capable of performing focus detection using an imaging plane phase difference system for performing pupil separation in a pixel structure. This is because a shape of each of pupils is not a perfect circle and blurred, and sensitivity distribution in which the center of gravity is distorted due to influence of vignetting is provided, so that one of the pupils that are separated tends to have characteristics to be biased to an inverse side with respect to the other pupil. Due to the influence of the image signal distortion as described above, it is determined in FIG. 3C that the degree of coincidence between the two images is high even though the in-focus state is not achieved.

Figure 4A:
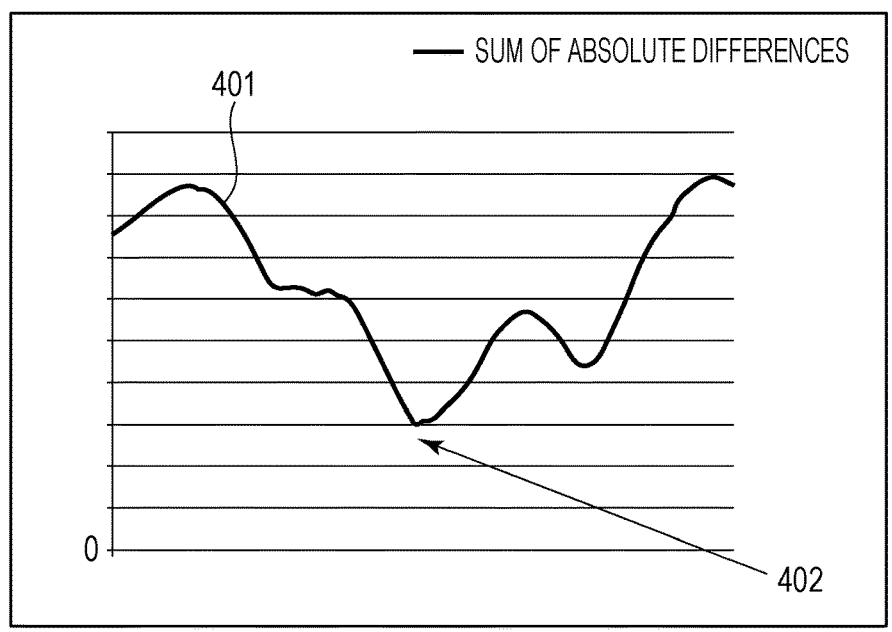
FIGS. 4A and 4B illustrate waveforms of a sum of absolute differences (SAD).

In FIG. 4A, a horizontal axis indicates a phase difference and a vertical axis indicates a sum of absolute differences between an A-image signal and a B-image signal for each of phase differences. The sum of absolute differences indicates an output of the correlation calculation portion 106 for each phase difference for the A-image signal and the B-image signal illustrated in FIG. 3C. It is indicated that a sum of absolute difference 402 for the phase difference corresponding to the state illustrated in FIG. 3C has the smallest value and the degree of the coincidence between the two images is high. That is, the state of FIG. 3C is a state in which the phase difference is 0, and the focus detection portion 109 determines that a current focus state is an in-focus state, but an in-focus position is not actually achieved and a so-called false in-focus state is achieved.

In the present embodiment, the CPU 111 detects such a false in-focus state and then controls the focus lens 101 to be driven so as to release the false in-focus state.

[Processing by Difference Amplification Portion/Correlation Calculation Portion]

In the present embodiment, the difference amplification portion 107 (FIG. 5) uses an A'-image signal and a B'-image signal, which are obtained by subtracting a difference between the A-image signal and B-image signal which are illustrated in FIG. 3C from the A-image signal and adding the difference to the B-image signal, to determine whether or not a false in-focus state is achieved. Details thereof will be described later.

Processing of the difference amplification which is performed for the A-image signal by the difference amplification portion 107 is expressed by the following expression. A pixel position is denoted by n. The A-image signal is donated by A(n), the B-image signal is denoted by B(n), and the A'-image signal obtained through the amplification of the difference is denoted by A'(n).

$$A'(n)=A(n)+(A(n)-B(n)) \ (n=0, 1 \ldots, n) \quad \text{(Expression 1)}$$

Additionally, processing of the difference amplification which is performed for the B-image signal by the difference amplification portion 107 is expressed by the following expression. A pixel position is denoted by n. The A-image signal is denoted by A(n), the B-image signal is denoted by B(n), and the B'-image signal obtained through the amplification of the difference is denoted by B'(n).

$$B'(n)=B(n)+(B(n)-A(n)) \ (n=0, 1 \ldots, n) \quad \text{(Expression 2)}$$

As described above, as to a pixel position of the A-image signal, at which a signal value is larger than that of the B-image signal, a difference therebetween is added to the A-image signal, and as to a pixel position of the A-image signal, at which a signal value is smaller than that of the B-image signal, a difference therebetween is subtracted from the A-image signal, resulting that an A'-image signal 305 of FIG. 3D is generated. Additionally, as to a pixel position of the B-image signal, at which a signal value is larger than that of the A-image signal, a difference therebetween is added to the B-image signal, and as to a pixel position of the B-image signal, at which a signal value is smaller than that of the A-image signal, a difference therebetween is subtracted from the B-image signal, resulting that an B'-image signal 306 of FIG. 3D is generated. That is, the difference between the A'-image signal 305 and the B'-image signal 306 becomes three times as large as the difference between the A-image signal 303 and the B-image signal 304.

By performing the processing of amplifying the difference between the A-image signal and the B-image signal in this manner, the A'-image signal 305 and the B'-image signal 306, in which a left side peak of the A-image signal 303 and a right side peak of the B-image signal 304 in which a biased difference is caused by the influence of image signal distortion are emphasized, are generated.

Figure 4B:
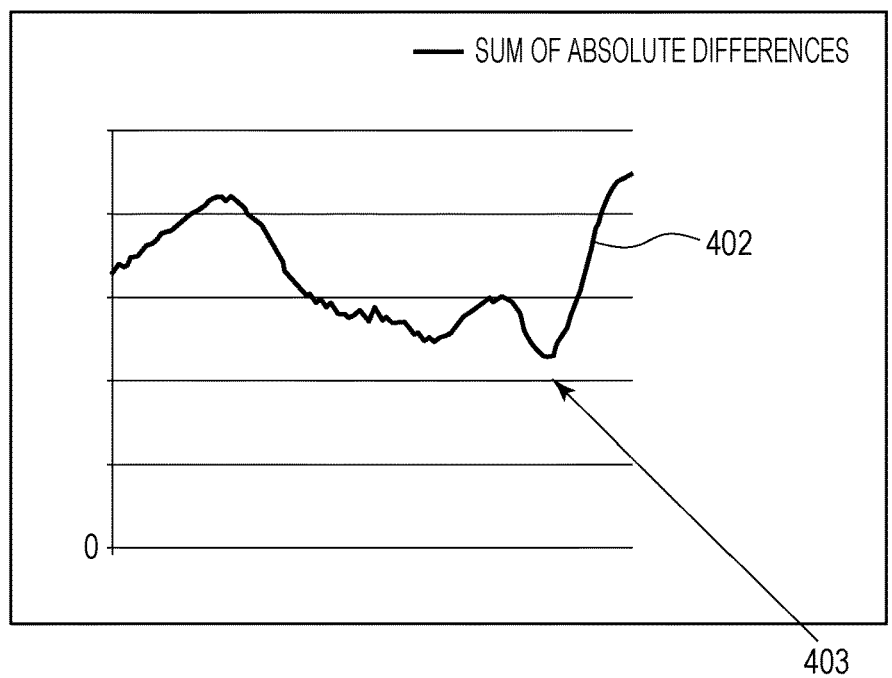

A waveform obtained by inputting the A'-image signal 305 and the B'-image signal 306 to the correlation calculation portion 108 is as illustrated in FIG. 4B. At a phase difference corresponding to a sum of absolute differences 403, the degree of coincidence between the A-image signal and the B-image signal becomes high (a sum of absolute differences becomes small). By adopting the phase difference corresponding to the sum of absolute differences 403, a defocus direction and a defocus amount are able to be obtained. Then, the focus lens 101 is driven in accordance with the defocus direction and the defocus amount and thereby it is possible to release the false in-focus state of FIG. 3C. The state of FIG. 3C occurs in a specific defocused state, so that it is possible to release the false in-focus state by exiting the specific defocused state.

Note that, in the in-focus state as illustrated in FIG. 3A, a different correlation calculation result is not detected by using the difference amplification portion 107. This is because a difference between the A-image signal and the B-image signal is small and the generated difference is sporadic.

Therefore, when the state is able to be determined to be an in-focus state on the basis of the results not only from the correlation calculation portion 106 but also from the correlation calculation portion 108, it can be said that that state is not a false in-focus state but the in-focus state.

[Effect by Difference Amplification Processing]

As described above, the difference between the A-image signal 303 and the B-image signal 304 is amplified and the shapes of waveforms are deformed and thereby the center of gravity of the A'-image signal 305 and the center of gravity of the B'-image signal 306 are separated, so that it is possible to detect an in-focus position different from a current position of the focus lens 101. For example, even when an amount of a DC component of the A-image signal is not so different from that of the B-image signal, the waveforms of the A-image signal and the B-image signal are emphasized, so that it is possible to determine a false in-focus state more accurately compared to a conventional technique.

That is, according to the present embodiment, by using the correlation calculation result based on the A'-image signal and the B'-image signal which are obtained by amplifying the difference between the A-image signal and the B-image signal, whether or not to be the false in-focus state is able to be determined more accurately even when the state is brought into the false in-focus state.

[Focus Adjustment Processing]

Figure 9:
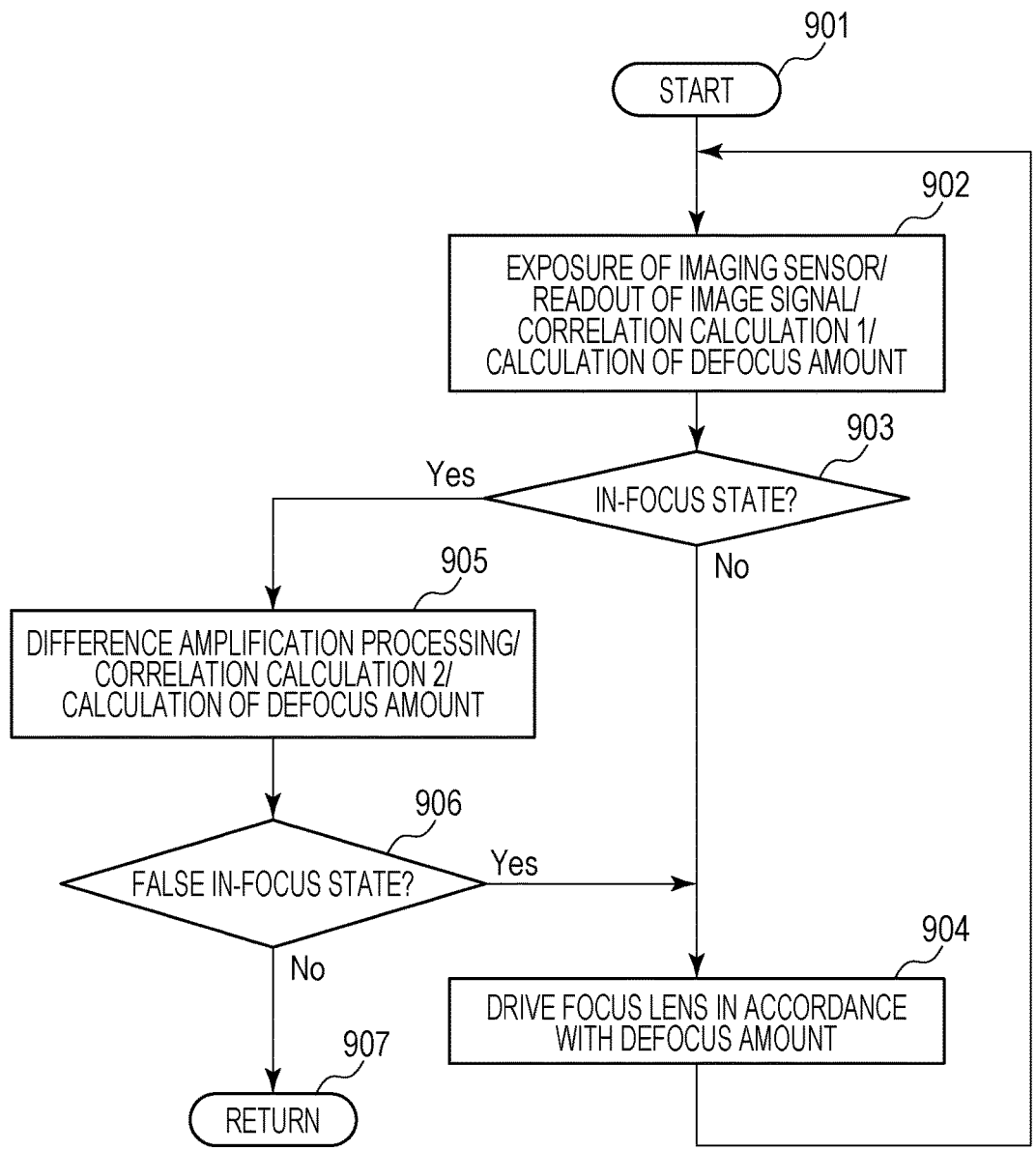
FIG. 9 is a flowchart of focus adjustment processing according to at least Embodiment 1.

An operation of the focus detection portion 109 will be described with reference to a flowchart of FIG. 9.

When focus adjustment processing is started at step 901, the CPU 111 performs control such that exposure of the imaging sensor 102 is performed and readout of an image signal is performed at step 902. Then, the correlation calculation portion 106 performs correlation calculation 1 by using an A-image signal and a B-image signal. The focus detection portion 109 calculates a defocus direction and a defocus amount on the basis of a result of the correlation calculation 1.

After that, at step 903, in-focus determination for determining whether or not a focus state is an in-focus state is performed on the basis of the result of the correlation calculation 1 at step 902. When there is no phase difference, that is, the A-image signal and the B-image signal substantially coincidence with each other, the CPU 111 determines that the in-focus state is achieved. As an example, when the defocus amount based on the result of the correlation calculation 1 is equal to or less than a first predetermined value which allows determining that an approximately in-focus state is achieved, the CPU 111 determines that the focus state is the in-focus state. Here, the CPU 111 may use another indicator to determine whether or not the in-focus state is achieved. For example, as a well-known method, there is a method of comparing a sum of absolute differences between the A-image signal and the B-image signal by a phase difference, at which a degree of coincidence between the A-image signal and the B-image signal becomes high, to a threshold.

When the CPU 111 determines that the in-focus state is not achieved at step 903, procedure proceeds to step 904, and when the CPU determines that the in-focus state is achieved, the procedure is branched to step 905.

When the CPU 111 determines that the in-focus state is not achieved at step 903, at step 904, the CPU 111 controls the focus lens 101 to be driven in accordance with the defocus direction and the defocus amount that are calculated at step 902. After that, the procedure returns to step 902 and is restarted from the exposure of the imaging sensor 102.

At step 905, the CPU 111 performs control such that the difference amplification portion 107 amplifies the difference between the A-image signal and the B-image signal and outputs an A'-image signal and a B'-image signal. Then, the correlation calculation portion 108 performs correlation calculation 2 by using the A'-image signal and the B'-image signal. The focus detection portion 109 calculates a defocus direction and a defocus amount on the basis of a result of the correlation calculation 2.

At step 906, the CPU 111 performs false in-focus determination for determining whether or not the focus state is a false in-focus state. As an example, when the defocus amount based on the result of the correlation calculation 2 is equal to or less than a second predetermined value, the CPU 111 determines that the focus state is not the false in-focus state. Note that, the second predetermined value may be the same as the first predetermined value described above.

When the CPU 111 determines that the state is the false in-focus state at step 906 even though the CPU 111 has determined that the in-focus state has been achieved at step 903, the procedure is branched to step 904. When the CPU 111 determines that the focus state is not the false in-focus state, the state is the in-focus state, so that the procedure proceeds to step 907 and ends the present flow.

The CPU 111 controls the focus lens 101 to be driven in accordance with the defocus direction and the defocus amount which are calculated by the focus detection portion 109 on the basis of the result of the correlation calculation 2 at step 905. Then, the present flow is repeated until the CPU 111 determines that the state is not the false in-focus state at step 906.

[Effect of Embodiment 1]

As described above, whether or not to be the false in-focus state is determined on the basis of the results of the correlation calculation portion 106 and the correlation calculation portion 108. This makes it possible to determine the false in-focus state more accurately. Additionally, when the CPU 111 determines that the state is the false in-focus state, the focus lens 101 is driven on the basis of the result of the correlation calculation 2 performed by the correlation calculation portion 108 by using the A'-image signal and the B'-image signal which are processed by the difference amplification portion 107 and in which the difference is amplified. In this manner, according to Embodiment 1, the focus lens 101 is able to be driven to release the false in-focus state.

<Embodiment 2>

Hereinafter, a focus detection apparatus of Embodiment 2 to which one or more features of the present disclosure is applied will be described with reference to FIGS. 7, 8, and 10. Note that, the description of a configuration common to that of Embodiment 1 will be omitted and the description will focus on a different point.

Figure 7:
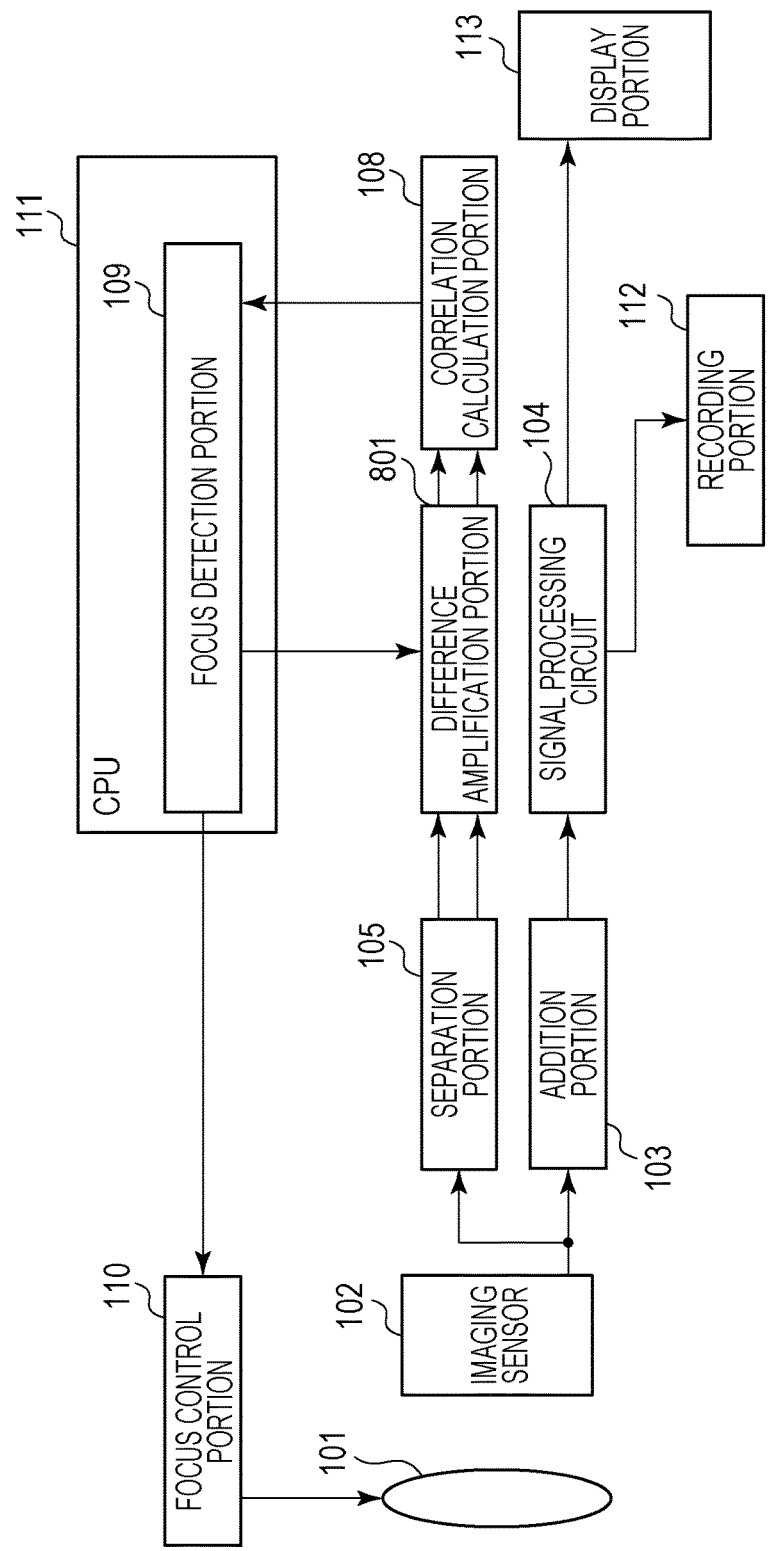
FIG. 7 is a block diagram of a focus detection apparatus according to at least Embodiment 2.

A block diagram of FIG. 7 of Embodiment 2 is different from the block diagram of FIG. 1 in that the correlation calculation portion 106 or the difference amplification portion 107 is not included and a difference amplification portion 801 whose configuration is different from that of the difference amplification portion 107 is included instead.

An output of the separation portion 105 is input to the difference amplification portion 801 and an output of the difference amplification portion 801 is input to the correlation calculation portion 108.

Figure 8:
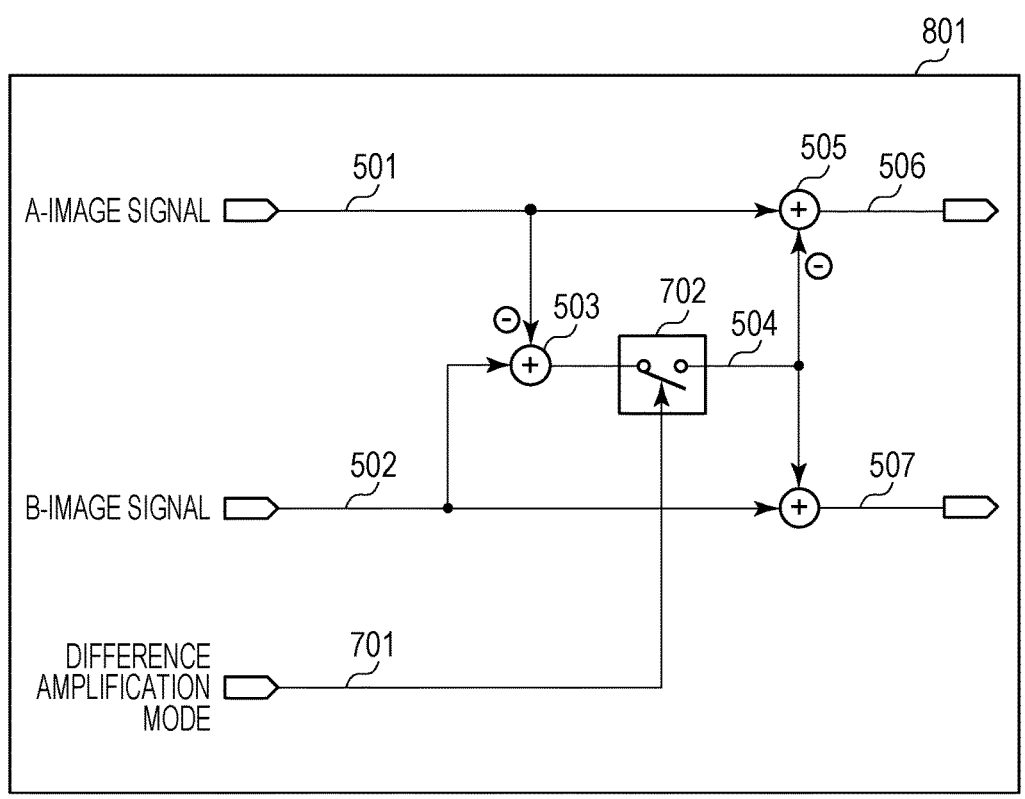
FIG. 8 is a circuit diagram of a difference amplification portion of at least Embodiment 2.

FIG. 8 is a circuit diagram of the difference amplification portion 801. A switch 702 is switched by a control signal 701 from the CPU 111, so that on/off of amplification processing of a difference between an A-image signal and a B-image signal is able to be switched.

[Focus Adjustment Processing]

Figure 10:
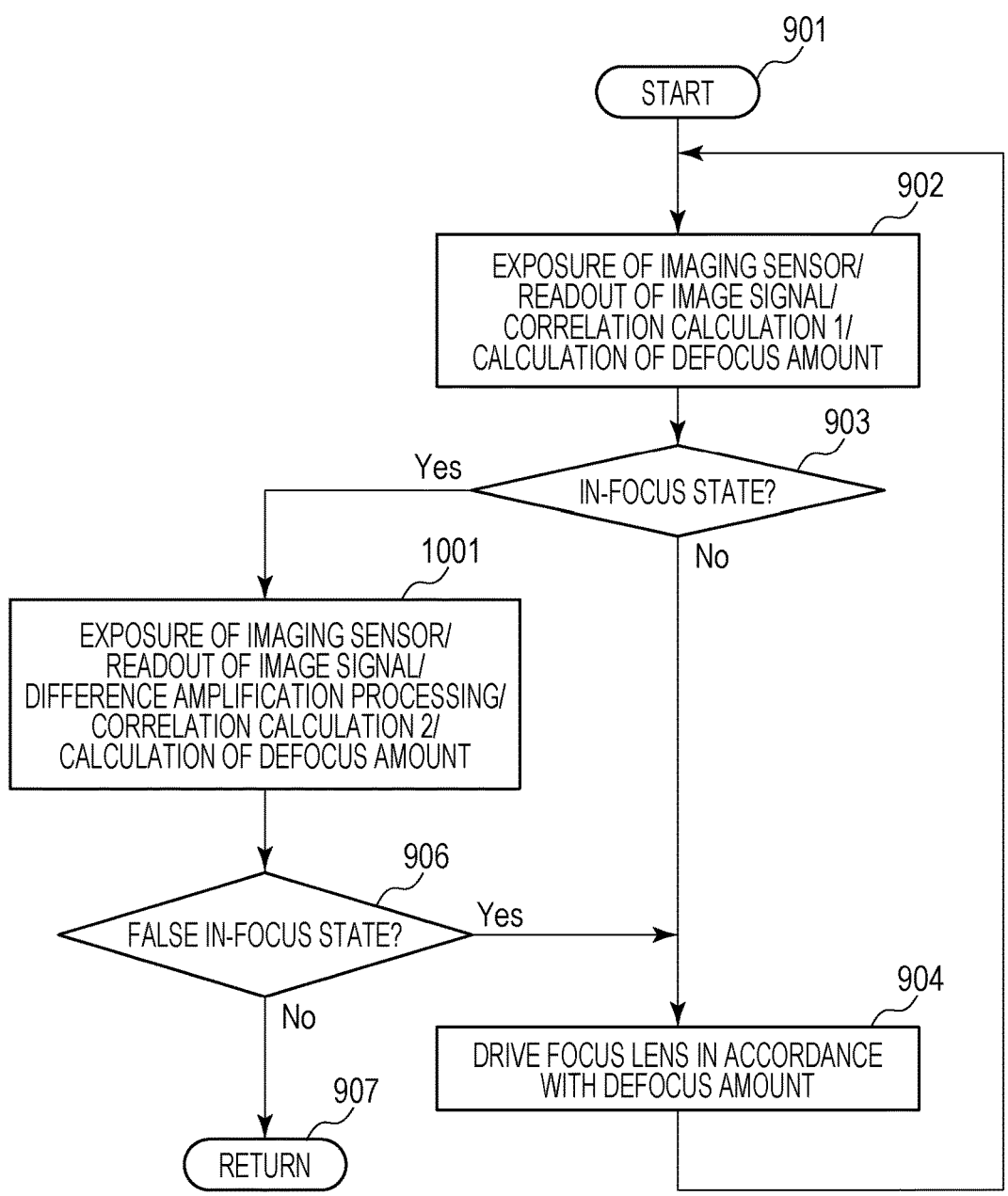
FIG. 10 is a flowchart of focus adjustment processing according to at least Embodiment 2.

FIG. 10 is a flowchart of focus adjustment processing of Embodiment 2.

When focus adjustment processing is started at step 901, the CPU 111 performs control such that exposure of the imaging sensor 102 is performed and readout of an image signal is performed at step 902. Then, the correlation calculation portion 108 performs correlation calculation 1 by using an A-image signal and a B-image signal. The focus detection portion 109 calculates a defocus direction and a defocus amount on the basis of a result of the correlation calculation 1. At this time, the CPU 111 controls the switch 702 of the difference amplification portion 801 to be turned off, so that the correlation calculation 108 performs the correlation calculation 1 without performing difference amplification processing.

At step 903, whether or not a focus state is an in-focus state is determined on the basis of the result of the correlation calculation 1 of step 902. As an example, when the defocus amount calculated at step 902 is equal to or less than a first predetermined value which allows determining that an approximately in-focus state is achieved, the CPU 111 determines that the focus state is the in-focus state. When the CPU 111 determines that the in-focus state is achieved, the procedure is branched to step 1001. When the CPU 111 determines that the in-focus state is not achieved at step 903, at step 904, the CPU 111 controls the focus lens 101 to be driven in accordance with the defocus direction and the defocus amount that are calculated at step 902. After that, the procedure returns to step 902 and is restarted from the exposure of the imaging sensor 102.

At step 1001, the CPU 111 performs control such that exposure of the imaging sensor 102 and readout of an image signal are performed again. The CPU 111 controls the switch 702 of the difference amplification portion 801 to be turned on, so that the difference amplification portion 801 amplifies a difference between the A-image signal and the B-image signal to output an A'-image signal and a B'-image signal. The correlation calculation portion 108 performs correlation calculation 2 by using the A'-image signal and the B'-image signal.

At step 906, the CPU 111 determines whether or not the focus state is a false in-focus state. As an example, when the defocus amount based on a result of the correlation calculation 2 is equal to or less than a second predetermined value, the CPU 111 determines that the focus state is not the false in-focus state. When the CPU 111 determines that the state is not the false in-focus state at step 906, the present flow ends at step 907. When the CPU 111 determines that the state is the false in-focus state on the basis of a result of step 1001, the procedure is branched to step 904 and the CPU 111 controls the focus lens 101 to be driven in accordance with the defocus direction and the defocus amount which are calculated at step 1001. Then, the present flow is repeated until the CPU 111 determines that the state is not the false in-focus state at step 1001.

[Effect of Embodiment 2]

As described above, Embodiment 2 has a configuration in which exposure is performed twice while switching the switch 702 of the difference amplification portion 801. Thereby, Embodiment 2 achieves a similar effect to that of Embodiment 1 and achieves an effect of allowing a configuration at low cost compared to Embodiment 1 because one correlation calculation portion is sufficient.

<Embodiment 3>

In each of the embodiments described above, an example in which difference amplification processing is performed by the difference amplification portion 107 or the difference amplification portion 801 has been described. In Embodiment 3, an example in which the difference amplification processing is performed by the CPU 111 by using a program stored in a memory 114. The description of a common point with Embodiment 1 will be omitted and the description will focus on a different point.

Figure 11:
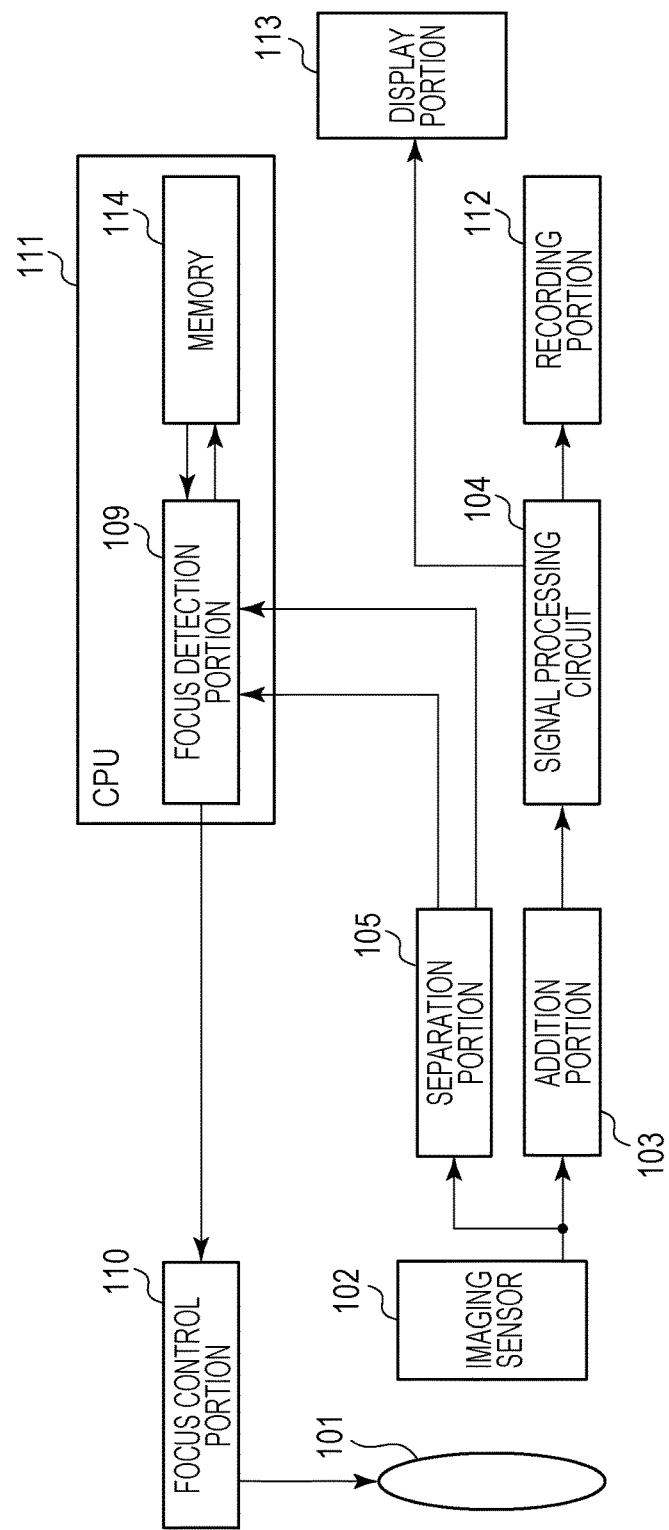
FIG. 11 is a block diagram of a focus detection apparatus according to at least Embodiment 3.

A block diagram of FIG. 11 is different from the block diagram of FIG. 1 in that the correlation calculation portion 106, the difference amplification portion 107, or the correlation calculation portion 108 is not included. In Embodiment 3, the processing performed by the correlation calculation portion 106, the difference amplification portion 107, and the correlation calculation portion 108 in Embodiment 1 is performed by the CPU 111 by executing a program stored in the memory 114 in the CPU 111.

[Focus Adjustment Processing]

Figure 12:
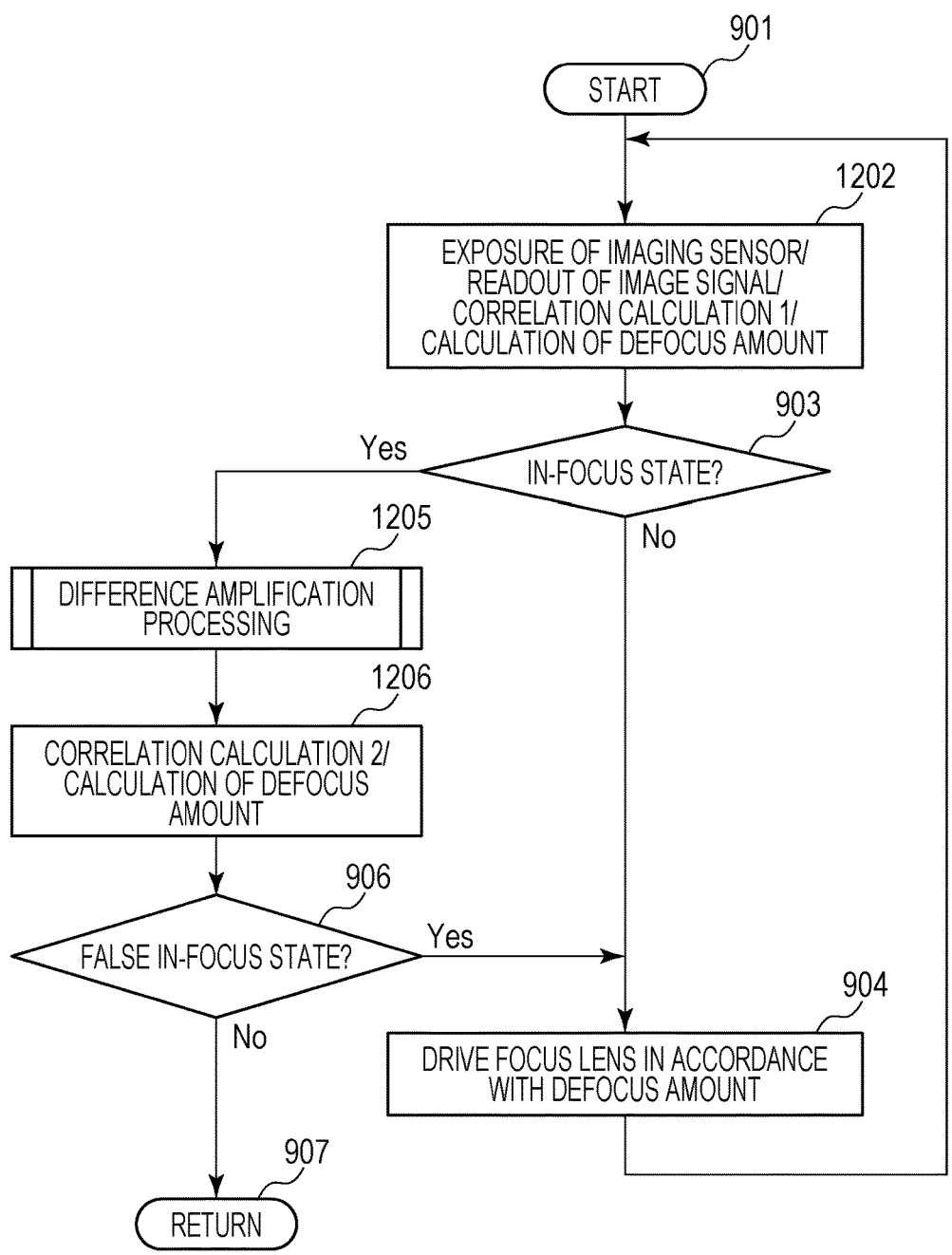
FIG. 12 is a flowchart of focus adjustment processing according to at least Embodiment 3.

FIG. 12 is a flowchart for explaining focus adjustment processing of Embodiment 3. In FIG. 12, processing corresponding to step 905 of FIG. 9 is illustrated to be divided into step 1205 and step 1206.

Difference amplification processing at step 1205 performed by the CPU 111 will be described in more detail with reference to a sub-flowchart of FIG. 13.

At step 1206, correlation calculation 2 is performed by using the A'-image signal and the B'-image signal which are obtained at step 1205, when the focus detection portion 109 in the CPU 111 executes a program stored in the memory 114 in the CPU 111.

Note that, similarly, correlation calculation 1 at step 1202 is also performed by using the A-image signal and the B-image signal which are separated in the separation portion 105, when the focus detection portion 109 in the CPU 111 executes the program stored in the memory 114 in the CPU 111.

[Difference Amplification Processing]

FIG. 13 is a sub-flowchart of difference amplification processing. When the difference amplification processing is started at step 1301, at step 1302, the CPU 111 controls a pointer indicating a pixel position to be set at head.

Next, at step 1303, the CPU 111 performs control such that an A-image signal and a B-image signal at a pixel position currently indicated by the pointer are read out from the memory 114.

Subsequently, at step 1304, the CPU 111 performs control such that a difference between the A-image signal and the B-image signal at the pixel position currently indicated by the pointer is added to the A-image signal and the resultant is stored in the memory 114.

Then, at step 1305, the CPU 111 performs control such that a difference between the B-image signal and the A-image signal at the pixel position currently indicated by the pointer is added to the B-image signal and the resultant is stored in the memory 114.

Next, at step 1306, the CPU 111 determines whether or not the pointer is set at a last pixel position. When the CPU 111 determines that the pointer is set at the last pixel position, the processing of the present flow ends at step 1308. When the CPU 111 determines that the pointer is not set at the last pixel position, the CPU 111 performs control such that the pointer indicating a pixel position is moved to a next pixel position at step 1307, and the procedure returns to step 1303. Then, the CPU 111 performs control so that the processing of steps 1303 to 1307 is repeated until the CPU 111 determines that the pointer is set at the last pixel position at step 1306.

[Difference Amplification Processing (C Language)]

When the difference amplification processing represented by the expressions 1 and 2 above is expressed by C language, the following list 1 is obtained, for example. A pixel position is denoted by i.

<List 1>

```
01:for (i=0;i<Length;i++){
02:a_prime[i]=a[i]+(a[i]-b[i]);
03:b_prime[i]=b[i]+(b[i]-a[i]);
04:}
```

A line 01 defines a loop in which a variable i is initialized and lines 02 to 04 are repeated by a length of the A-image signal and the B-image signal.

In the line 02, a difference between a pixel value that is an i-th element of an array of the A-image signal and a pixel value that is an i-th element of the B-image signal is added to the pixel value of the A-image signal.

In the line 03, a difference between a pixel value that is an i-th element of an array of the B-image signal and a pixel value that is an i-th element of the A-image signal is added to the pixel value of the B-image signal.

The difference amplification processing is performed for all pixels of the A-image signal and the B-image signal by executing the loop from the lines 01 to 04.

[Effect of Embodiment 3]

As described above, Embodiment 3 achieves a similar effect to that of Embodiment 1 and achieves a configuration at low cost compared to Embodiment 1 and Embodiment 2 because the CPU 111 executes a program without the correlation calculation portion 106, the difference amplification portion 107, or the correlation calculation portion 108.

[Other Embodiments]

In the embodiments described above, since one multiple of a difference between an A-image signal and a B-image signal is given to the A-image signal and the B-image signal, the difference becomes three times as large as the original difference. However, not only one multiple but also any multiple of the difference may be added while staying within the scope of the present disclosure.

Additionally, it is desirable that, before a difference between the A-image signal and the B-image signal is amplified by the difference amplification portion 107, amplitudes (signal levels) thereof are subjected to normalization processing so that amplitudes of an A-image and a B-image become uniform through shading correction, AGC, or the like.

Additionally, the second predetermined value may be a value larger than the first predetermined value. As long as the second predetermined value is a threshold which allows determining that the state is a false in-focus state, a similar effect to those of the embodiments above is achieved.

Additionally, although a configuration in which the camera has the focus lens 101 has been described above, a lens interchangeable camera may be used. Also in such a case, a similar effect to those of the embodiments above is achieved.

In Embodiment 1, the A-image signal and the B-image signal are directly used to perform correlation calculation, but even when a band pass filter is used for focusing on a specific frequency, a similar effect to that of Embodiment 1 is able to be achieved.

Additionally, in Embodiment 1, an example in which the A-image signal/B-image signal and the A'-image signal/B'-image signal are respectively processed by different circuits of the correlation calculation portion 106 and the correlation calculation portion 108 has been described. Here, for example, even in the case of a configuration in which only the correlation calculation portion 106 is provided and the A-image signal/B-image signal or the A'-image signal/B'-image signal are input as a pair of image signals to the correlation calculation portion 106 to perform correlation calculation, a similar effect to that of Embodiment 1 is able to be achieved.

As described above, though embodiments of the disclosure have been described, the invention is not limited to the embodiments and may be variously modified or changed within the scope of the gist thereof.

[Other Embodiments]

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-237111 filed Dec. 6, 2016, which is hereby incorporated by reference herein in its entirety.

What is claimed is:

1. A focus detection apparatus, comprising:
    a memory that stores a program of instructions; and
    at least one processor that executes the program of instructions to cause the focus detection apparatus to:
    perform a first correlation calculation in accordance with a pair of image signals, which pair of image signals is based on an output of an imaging sensor that receives a pair of luminous fluxes passing through different pupil areas of an imaging optical system and performs photoelectric conversion to the pair of luminous fluxes;
    amplify a difference between a first image signal and a second image signal of the pair of image signals, and output a third image signal corresponding to the first image signal and a fourth image signal corresponding to the second image signal; and
    determine whether or not a focus state is a false in-focus state on a basis of a result of a second correlation calculation according to the third image signal and the fourth image signal.

2. The focus detection apparatus according to claim 1, wherein the at least one processor further operates to cause the focus detection apparatus to determine whether or not the focus state is an in-focus state on a basis of a result of the first correlation calculation according to the first image signal and the second image signal, and
    wherein when the focus detection apparatus determines that the focus state is the in-focus state, the focus detection apparatus further determines whether or not the focus state is the false in-focus state on the basis of the result of the second correlation calculation.

3. The focus detection apparatus according to claim 2, wherein the at least one processor further operates to cause the focus detection apparatus to determine that the focus state is the in-focus state when a defocus amount based on the result of the first correlation calculation is equal to or less than a first predetermined value, and determine that the focus state is not the in-focus state when the defocus amount is more than the first predetermined value.

4. The focus detection apparatus according to claim 1, wherein the at least one processor further operates to cause the focus detection apparatus to determine that the focus state is an in-focus state when a defocus amount based on the result of the second correlation calculation is equal to or less than a second predetermined value, and determine that the focus state is the false in-focus state when the defocus amount is more than the second predetermined value.

5. The focus detection apparatus according to claim 1, wherein the at least one processor further operates to cause the focus detection apparatus to control driving of a focus lens in accordance with a result of the first correlation calculation, and
 wherein when the focus detection apparatus determines that the focus state is the false in-focus state, the focus detection apparatus controls driving of the focus lens in accordance with the result of the second correlation calculation.

6. The focus detection apparatus according to claim 1, wherein the at least one processor further operates to cause the focus detection apparatus to normalize signal levels of the first image signal and the second image signal, amplify a difference between the first image signal and the second image signal, and output the third image signal and the fourth image signal.

7. A control method of a focus detection apparatus, the method comprising the steps of:
 performing a first correlation calculation in accordance with a pair of image signals, which pair of image signals is based on an output of an imaging sensor that receives a pair of luminous fluxes passing through different pupil areas of an imaging optical system and performs photoelectric conversion to the pair of luminous fluxes;
 amplifying a difference between a first image signal and a second image signal of the pair of image signals and outputting a third image signal corresponding to the first image signal and a fourth image signal corresponding to the second image signal; and
 determining whether or not a focus state is a false in-focus state on a basis of a result of a second correlation calculation according the third image signal and the fourth image signal.

8. A non-transitory storage medium storing at least one program that causes a computer to execute a control method of a focus detection apparatus, the method comprising:
 performing a first correlation calculation in accordance with a pair of image signals, which pair of image signals is based on an output of an imaging sensor that receives a pair of luminous fluxes passing through different pupil areas of an imaging optical system and performs photoelectric conversion to the pair of luminous fluxes;
 amplifying a difference between a first image signal and a second image signal of the pair of image signals and outputting a third image signal corresponding to the first image signal and a fourth image signal corresponding to the second image signal; and
 determining whether or not a focus state is a false in-focus state on a basis of a result of a second correlation calculation according the third image signal and the fourth image signal.

* * * * *